(12) United States Patent
Kuivalainen et al.

(10) Patent No.: US 9,651,244 B2
(45) Date of Patent: May 16, 2017

(54) METHOD OF OPERATING AN OXYCOMBUSTION CIRCULATING FLUIDIZED BED BOILER

(75) Inventors: Reijo Kuivalainen, Varkaus (FI); Timo Eriksson, Varkaus (FI); Arto Hotta, Varkaus (FI)

(73) Assignee: AMEC FOSTER WHEELER ENERGIA OY, Espoo (FI)

( * ) Notice: Subject to any disclaimer, the term of this patent is extended or adjusted under 35 U.S.C. 154(b) by 982 days.

(21) Appl. No.: 13/996,663

(22) PCT Filed: Feb. 1, 2012

(86) PCT No.: PCT/FI2012/050089
§ 371 (c)(1),
(2), (4) Date: Jul. 8, 2013

(87) PCT Pub. No.: WO2012/104487
PCT Pub. Date: Aug. 9, 2012

(65) Prior Publication Data
US 2013/0284121 A1    Oct. 31, 2013

(30) Foreign Application Priority Data
Feb. 4, 2011 (FI) .................................. 20115112

(51) Int. Cl.
*F22B 1/00* (2006.01)
*F22B 31/00* (2006.01)
(Continued)

(52) U.S. Cl.
CPC ............ *F22B 1/003* (2013.01); *B01D 53/508* (2013.01); *F01K 17/04* (2013.01); *F01K 17/06* (2013.01);
(Continued)

(58) Field of Classification Search
None
See application file for complete search history.

(56) References Cited

U.S. PATENT DOCUMENTS 2,461,958 A * 2/1949 Bonnell ................. C10G 51/00
208/156
2,765,222 A * 10/1956 Barr ......................... C01B 3/30
252/373

(Continued)

FOREIGN PATENT DOCUMENTS

CN    1566749 A    1/2005
WO    97/06889 A1  2/1997

OTHER PUBLICATIONS

Notice Concerning Transmittal of and International Preliminary Report on Patentability completed Aug. 6, 2013, and mailed Aug. 15, 2013, in corresponding International Application No. PCT/FI2012/050089.

(Continued)

*Primary Examiner* — Gregory Huson
*Assistant Examiner* — Eric Gorman
(74) *Attorney, Agent, or Firm* — Fitzpatrick, Cella, Harper & Scinto

(57) ABSTRACT

A method of operating an oxycombustion circulating fluidized bed (CFB) boiler that includes a furnace having a grid at its bottom section, a solid material separator connected to an upper part of the furnace, and an external solid material handling system. Oxidant gas is introduced into the CFB boiler through the grid as fluidizing gas, the fluidizing gas including recirculating flue gas. Fuel material is introduced into the circulating fluidized bed. A sulfur reducing agent including $CaCO_3$ is introduced into the circulating fluidized bed. Solid material is circulated out of the furnace and provides an external circulation of solid material via the external solid material handling system. The solid material (Continued)

is fluidized in the external solid material handling system by introducing a fluidizing medium including recirculating flue gas into the handling system. A predetermined amount of steam is introduced into the handling system as a component of the fluidizing medium.

18 Claims, 5 Drawing Sheets

(51) Int. Cl.
| | |
|---|---|
| B01D 53/50 | (2006.01) |
| B01J 20/34 | (2006.01) |
| F23C 10/10 | (2006.01) |
| F23C 10/04 | (2006.01) |
| F23L 7/00 | (2006.01) |
| F23C 10/00 | (2006.01) |
| F23C 10/32 | (2006.01) |
| F01K 17/04 | (2006.01) |
| F01K 17/06 | (2006.01) |

(52) U.S. Cl.
CPC ............ *F23C 10/002* (2013.01); *F23C 10/04* (2013.01); *F23C 10/32* (2013.01); *F23L 7/005* (2013.01); *F23L 7/007* (2013.01); *B01D 2251/404* (2013.01); *B01D 2251/606* (2013.01); *F23C 2206/103* (2013.01); *Y02E 20/344* (2013.01)

(56) References Cited

U.S. PATENT DOCUMENTS

| | | | | |
|---|---|---|---|---|
| 3,460,934 A | * | 8/1969 | Kelmar | C21B 5/003 75/459 |
| 3,481,834 A | * | 12/1969 | Squires | C10B 53/08 201/17 |
| 3,719,192 A | * | 3/1973 | Squires | B01J 3/02 137/1 |
| 3,734,833 A | * | 5/1973 | Singh | C10B 49/22 201/17 |
| 4,026,679 A | * | 5/1977 | Collin | C10J 3/54 110/342 |
| 4,137,129 A | * | 1/1979 | Bjorklund | B01D 3/007 203/26 |
| 4,191,540 A | * | 3/1980 | Mitchell | C10J 3/54 252/373 |
| 4,377,066 A | * | 3/1983 | Dickinson | B01D 47/00 60/39.464 |
| 4,617,877 A | * | 10/1986 | Gamble | F22B 31/0023 110/216 |
| 4,665,864 A | * | 5/1987 | Seshamani | F22B 31/0084 122/4 D |
| 4,682,567 A | * | 7/1987 | Garcia-Mallol | F22B 31/0038 110/245 |
| 4,709,662 A | * | 12/1987 | Rawdon | B01J 8/388 110/245 |
| 4,714,032 A | * | 12/1987 | Dickinson | C02F 11/086 110/238 |
| 5,082,251 A | * | 1/1992 | Whipp | C21B 13/0033 266/142 |
| 5,192,486 A | * | 3/1993 | Whipp | C21B 13/0033 266/156 |
| 5,341,753 A | * | 8/1994 | Russell | F23L 7/005 110/245 |
| 5,342,594 A | * | 8/1994 | Sarkomaa | B01J 8/005 423/244.08 |
| 5,344,632 A | * | 9/1994 | Tang | B01J 8/085 423/243.01 |
| 5,535,687 A | * | 7/1996 | Khanna | F22B 31/0069 110/245 |
| 5,810,976 A | * | 9/1998 | Keith | B01D 3/10 159/24.1 |
| 6,505,567 B1 | | 1/2003 | Anderson et al. | |
| 8,230,796 B2 | | 7/2012 | Andrus, Jr. et al. | |
| 2006/0010714 A1 | * | 1/2006 | Carin | F26B 19/005 34/514 |
| 2006/0101665 A1 | * | 5/2006 | Carin | F26B 19/005 34/513 |
| 2008/0217444 A1 | * | 9/2008 | Michalek | A61L 11/00 241/1 |
| 2009/0211500 A1 | | 8/2009 | Andrus, Jr. et al. | |
| 2009/0211503 A1 | | 8/2009 | Andrus, Jr. et al. | |
| 2010/0147516 A1 | * | 6/2010 | Betzer-Zilevitch | B03D 1/02 166/272.6 |
| 2010/0266477 A1 | * | 10/2010 | Ishii | C10J 3/463 423/437.1 |
| 2015/0139882 A1 | * | 5/2015 | Warren | B01D 53/508 423/244.07 |
| 2016/0068758 A1 | * | 3/2016 | Linck | C10G 1/002 585/242 |
| 2016/0207778 A1 | * | 7/2016 | Rossi | C04B 2/06 |

OTHER PUBLICATIONS

Finnish Office Action dated Dec. 2, 2011, issued in corresponding Finnish Patent Application No. 20115112.
Notification of and International Search Report completed May 3, 2012, and mailed May 9, 2012, in corresponding International Application No. PCT/FI2012/050089.
Written Opinion mailed May 9, 2012, in corresponding International Application No. PCT/FI2012/050089.

* cited by examiner

METHOD OF OPERATING AN OXYCOMBUSTION CIRCULATING FLUIDIZED BED BOILER

CLAIM OF PRIORITY

This application is a U.S. national stage application of PCT International Application No. PCT/FI2012/050089, filed Feb. 1, 2012, published as International Publication No. WO 2012/104487 A1, and which claims priority from Finnish patent application number 20115112, filed Feb. 4, 2011.

TECHNICAL FIELD

The invention relates to oxycombustion circulating fluidized bed boilers. The invention also relates to a method of operating an oxycombustion circulating fluidized bed boiler.

BACKGROUND ART

Combustion of solid fuel in a fluidized bed of solid material such as bubbling (BFB) and circulating fluidized beds (CFB), is known to be advantageous in many respects. Due to the low furnace temperature and the use of hot circulating solids, many beneficial features, such as low $NO_x$ and $SO_x$ emissions, fuel flexibility, and capability of using low grade fuel, are achieved in a CFB process. Capturing of many substances present in or originating from the combustion reactions may be readily accomplished by appropriately selecting the bed material that is used. For example, sulfur emissions may be considerably reduced by using materials that react with sulfur to facilitate sulfur capturing.

CFB combustion is well known as an air combustion process, an example thereof being discussed in a Chinese patent publication. Patent CN 1566749 A, which also shows a method of implementing a high pressure fluidization blast using steam, instead of air, in normal operation of a boiler. The fluidization steam, source pressure is greater than 60 kPa, and the superheating degree is more than 30° C.

New regulations and other demands limiting the gas emissions related to the so-called greenhouse effect have encouraged development of new technologies aimed towards decreasing carbon dioxide emissions from power stations using fossil carbonaceous fuels. While, in conventional firing, the oxygen required for burning the fuel is fed in the form of air, in oxycombustion, the air is replaced with a mixture of substantially pure oxygen and recycled flue gas, which may be called an oxidant.

Oxycombustion is based on combusting carbonaceous fuel with substantially pure oxygen, typically, of at least 95% purity, so as to have carbon dioxide and water as the main components of the exhaust gas discharged from the boiler. Thereby, the carbon dioxide can be captured relatively easily, without having to separate it from a gas stream having nitrogen as its main component, as when combusting the fuel with air.

Once of the mechanisms of sulfur capture in the furnace, when limestone is used, is as follows. The limestone calcines in the furnace to form calcium oxide:

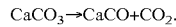
$CaCO_3 \rightarrow CaCO+CO_2$.

Calcium oxide reacts with $SO_2$ to form calcium sulfate by a reaction:

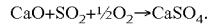
$CaO+SO_2+\frac{1}{2}O_2 \rightarrow CaSO_4$.

Another known mechanism is direct sulfatizing with a reaction:

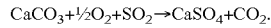
$CaCO_3+\frac{1}{2}O_2+SO_2 \rightarrow CaSO_4+CO_2$.

$CaSO_4$ being a solid material, may be removed from the gas by separation. The course of the reactions is naturally dependent on the prevailing temperature and, particularly, on the partial pressure of the $CO_2$.

$CaSO_4$, $CaCO_3$, as well as CaO, are efficiently mixed into the bed material of the CFB boiler and, thus, they are also present in the external circulation of solid material of the CFB boiler. The formed calcium sulfate can, thus, be removed from the furnace together with the ashes. Therefore, a combustion process using a circulating fluidized bed boiler does not necessarily need additional sulfur reducing equipment in the exhaust gas channel, or the efficiency of such equipment can be relatively low.

In order to maintain the optimum temperature for low emissions and high combustion efficiency within the furnace of a CFB boiler, a sufficient heat transfer surface must be provided to remove heat from the combusting products. The heat transfer surface can be provided by arranging a fluidized bed heat exchanger (FBHE) in the external circulation of solid material, which cools the externally circulated solids before they are returned back to the furnace. This is also the case with oxycombustion CFB boilers.

U.S. Pat. No. 6.505,567 discloses a circulating fluidized bed steam generator and a method of operating the same. A fluidized bed heat exchanger is also shown to be coupled to the external circulation of solid material. The method includes the step of introducing a substantially pure oxygen feed stream into the circulating fluidized bed steam generator and the step of combusting a fuel in the presence of the substantially pure oxygen feed stream, to produce a flue gas having carbon dioxide and water vapor as its two largest constituent elements by volume. The method includes the step of separating the flue gas into an end product portion and a recycling portion and directing the recycling portion of the flue gas to the circulating fluidized bed steam generator to contribute to the combustion process therein. The recycling portion of the flue gas is also used for fluidizing gas in the fluidized bed heat exchanger.

It has been recently discovered that in an oxycombustion CFB boiler, there may occur disadvantageous behavior in the solids handling system due to the presence of CaO, when the fluidization of solid material is accomplished, making use of a recycled portion of the flue gas containing a high concentration of $CO_2$. This is due to the tact that CaO has a tendency to recarbonate back to $CaCO_3$ in certain circumstances.

DISCLOSURE OF THE INVENTION

An object of the invention is to provide a method of operating an oxycombustion CFB boiler, which solves the above-mentioned and other problems of the prior art. A particular object of the invention is to provide a method of operating an oxycombustion CFB boiler, in which recirculating flue gas is used as fluidizing gas and a sulfur reducing agent comprising $CaCO_3$ is used for sulfur capture, and which method provides a reliable operation of an external solid material handling system of the oxycombustion CFB boiler, and that minimizes the disadvantageous behavior in the external solid material handling system due to the presence of CaO in the solid material, when the fluidization is accomplished making use of gas containing a high concentration of $CO_2$.

Objects of the invention are met by a method comprising steps of arranging a circulating fluidized bed in the oxycombustion CFB boiler, introducing an oxidant gas into the CFB boiler through the grid as fluidizing gas, the fluidizing gas comprising recirculating flue gas, introducing fuel material into the circulating fluidized bed, introducing a sulfur reducing agent comprising $CaCO_3$ into the circulating fluidized bed, circulating solid material out of the furnace and providing an external circulation of solid material via the external solid material handling system, fluidizing the solid material in the solid material handling system by introducing a fluidizing medium comprising recirculating the gas into the external solid material handling system.

It is a characteristic of the invention that a predetermined amount of steam is introduced into the external solid material handling system as a component of the fluidization medium.

This way, the control and operation of the external solid material handling system is reliable, since the recarbonization of CaO at temperatures below the equilibrium calcination temperature is minimized, and the disadvantageous phenomena caused by excessive formation of $CaCO_3$ in the system is substantially avoided, or at least, minimized. Thus, potential bed agglomeration/sintering by formation of $CaCO_3$ is minimized. Additionally, since the reaction of recarbonization CaO consumes $CO_2$, and the reaction is substantially avoided. A loss of fluidizing gas is accordingly substantially avoided.

According to an embodiment of the invention, the steam is mixed into the fluidizing medium prior to its introduction into the external solid material handling system as a fluidizing medium.

According to another embodiment of the invention, the steam is distributed evenly into the external solid material handling system as a fluidizing medium separately from the other components of the fluidizing medium introduced into the external solid material handling system.

According to yet another embodiment of the invention, the steam is mixed into the fluidizing medium during its introduction into the external solid material handling system as a fluidizing medium.

According to a further embodiment of the invention, the steam is generated as expansion steam from water originally at a first pressure and at a first temperature by depressurizing the water to a second pressure, being lower than the first pressure, prior to the introduction of the steam into the external solid material handling system as a fluidizing medium.

According to yet another embodiment of invention, the steam is generated as expansion steam from water originally at a first pressure and at a first temperature by depressurizing the water to a second pressure, being lower than the first pressure, during the introduction of the steam into the external solid material handling system as a fluidizing medium.

The predetermined amount of steam is mixed into the fluidizing medium so as to replace $CO_2$ in the fluidizing medium. A high concentration of $CO_2$ in the fluidizing medium is, thus, reduced by replacing $CO_2$ with steam.

This way, the control and operation of the loop seal is reliable, since the recarbonization of CaO at temperatures below the equilibrium for the calcination temperature is minimized, and the phenomena caused by excessive formation of $CaCO_3$ in the loop seal, namely, potential bed agglomeration/sintering and loss of fluidizing gas, is accordingly substantially avoided.

According to an embodiment of the invention, solid material is transported with the flue gases to a solid material separator. Solid material is separated from the flue gases in the solid material separator. The separated solid material is recycled from the separator back to the furnace through the external solid material handling system. The external solid material handling system comprises a loop seal, in which the solid material is controllably fluidized to control the flow of the solid material back to the furnace. A predetermined amount of steam is mixed into the fluidizing medium prior to or during its introduction into the loop seal, and fluidizing the solid material.

According to an embodiment of the invention, the external solid material handling system comprises a fluidized bed heat exchanger and the solid material is circulated out of the furnace of the CFB boiler into a fluidizing bed heat exchanger and, in the method, a predetermined amount of steam is mixed into the fluidizing medium prior to or during its introduction into the fluidized bed heat exchanger for fluidizing the solid material therein. This way, the control and the operation of the fluidizing bed heat exchanger is reliable, since the recarbonization of CaO is minimized, and the phenomena caused by an excessive amount of $CaCO_3$ are minimized. Such disadvantageous phenomena are, inter alia, potential bed agglomeration/sintering, loss of fluidizing gas, and carburization of heat surface tubes in a high $CO_2$ environment, and are substantially avoided or at least minimized.

The fluidizing medium comprises recirculating flue gas and the predetermined amount of steam is controlled so that the $CO_2$ partial pressure in the fluidizing medium is maintained below the equilibrium pressure for recarbonization of CaO at the prevailing temperature in the external solid material handling system.

According to an embodiment of the invention, the fluidizing medium comprises a first portion of the recirculating flue gas, a second portion of oxygen, and a third portion of steam, and the method comprises a step of determining the flow rate or amount of sulfur reducing agent comprising $CaCO_3$ introduced into the circulating fluidizing bed, and a step of defining the relative shares of the first portion, the second portion, and the third portion, based on the predetermined flow rate or amount of introduced sulfur reducing agent, and introducing the fluidizing medium comprising the defined relative shares of the first portion, the second portion, and the third portion of the recirculating flue gas, the oxygen, and the steam, respectively.

Further, according to an embodiment of the invention, the $CO_2$ content of the recirculating flue gas is determined, which is taken into account when the $CO_2$ partial pressure in the fluidizing medium is determined.

According to an embodiment of the invention, the temperature of the solid material in the external solid material handling system is measured directly or indirectly, and the step of defining the relative shares of the first portion, the second portion, and the third portion comprises utilization of the actual solid material temperature information.

The steam used, i.e., introduced into the external solid material handling system, in method of the invention, is preferably superheated, and the pressure is substantially at the prevailing pressure level in the target environment. For example, the pressure of the introduced steam is preferably about 0.5 to about 5 bar above the atmospheric pressure, and the temperature is about 140 to about 200° C.

According to an embodiment of the invention, the steam is generated utilizing the heat produced in the oxycombustion CFB boiler.

According to another embodiment of the invention, the steam is generated as expansion steam.

BRIEF DESCRIPTION OF DRAWINGS

In the following, the invention will be described with the reference to the accompanying schematic drawings, in which.

BEST MODE FOR CARRYING OUT THE INVENTION

Figure 1:
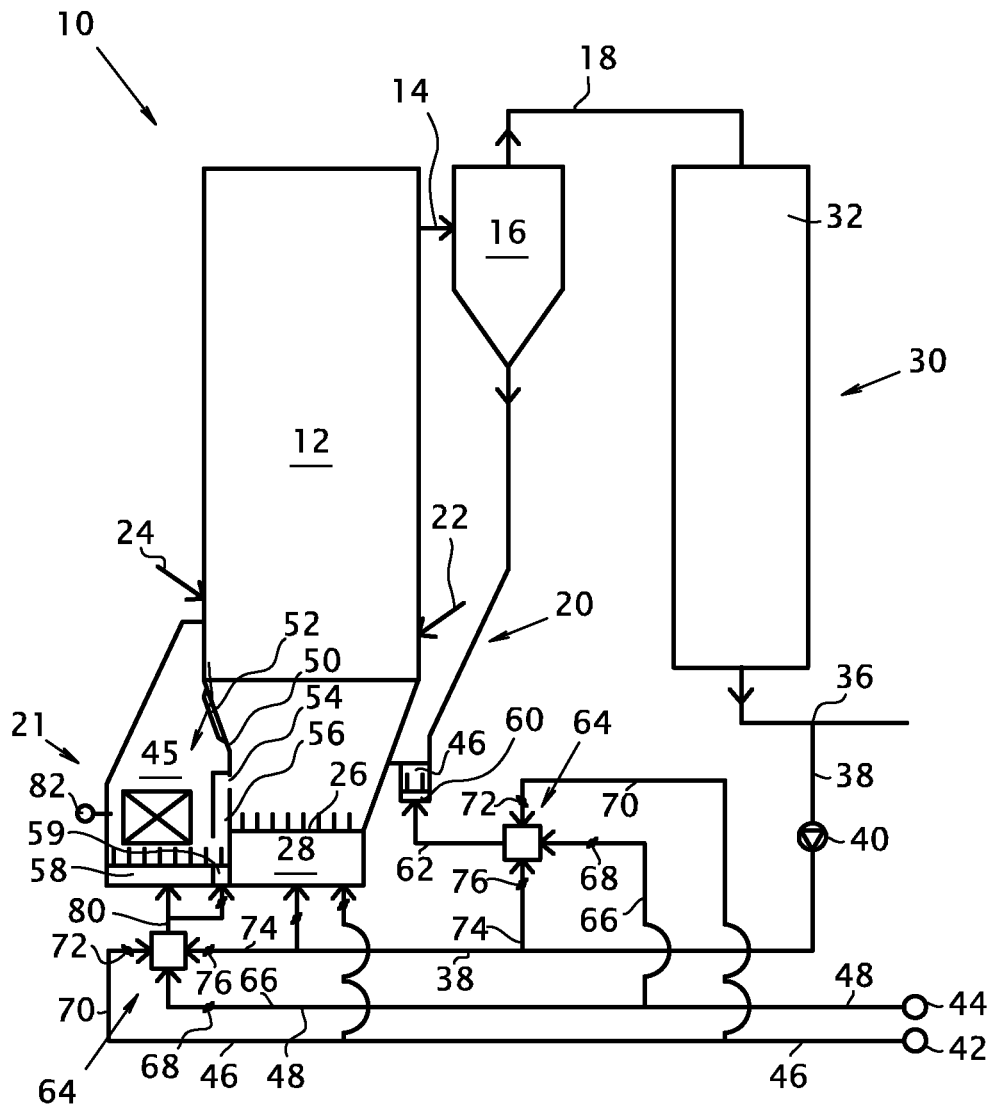
FIG. 1 illustrates an oxycombustion CFB boiler, in which the method of operating an oxycombustion CFB boiler according to an embodiment of the invention may be advantageously practiced.

FIG. 1 schematically shows an oxycombustion CFB boiler 10, which may also be called, in the following, a CFB boiler. The CFB boiler 10 comprises a furnace 12 with an upper part having four substantially vertical side walls, a bottom part having four side walls, of which two are normally inwardly inclined side walls, a discharge conduit 14 in the upper part or upper end of the furnace 12 for taking the flue gas and solid particles suspended thereby to a solid material separator 16, and a flue gas passage 18 arranged in the upper end of the solid material separator 16 for removing the exhaust gas from the solid material separator 16.

The CFB boiler also comprises a fuel feed 22 arranged at a side wall of the furnace, and a feed for introducing a sulfur reducing agent comprising $CaCO_3$ into the circulating fluidized bed 24 is also arranged at a side wall of the furnace 12. The oxycombustion CFB boiler 10 comprises a grid 26 at the bottom section of the furnace 12 and a wind box 28 arranged in connection with the grid 26. A fluidizing medium is introduced through the wind box 28 and the grid 26 into the furnace 12 in the operation of the CFB boiler. There are conduits with control valves arranged for introducing at least recycling gas and oxygen into the wind box 28.

The flue gas passage 18 extending from the solid material separator 16 is provided with a flue gas treatment system 30 that advantageously comprises heat exchangers 32 for recovering heat from the flue gases. The passage 18 is also provided with a branch 36 that provides an outlet connected to a flue gas recycling conduit 38, through which the recycling portion of the flue gas is made available to the furnace 12 and/or its auxiliary equipment. The recycling conduit 38 is provided with a recycling blower 40 for raising the pressure of the recycling flue gas to an adequate level, In an oxycombustion CFB boiler, the recycling flue gas is used as fluidizing gas, with the recycling flue gas containing considerably great amounts of $CO_2$.

A first solid material returning system is also arranged at the lower end of the solid material separator 16 for circulating solid material thus providing an external circulation of solid material. This may be considered to be the first external solid material handling system 20 in the CFB boiler of FIG. 1. The first external solid material handling system 20 may be used for controllably returning at least part of the separated solid material, i.e., bed material, back to the bottom part of the furnace 12. In this context, the external solid material handling system 20 means an arrangement in which the bed material of the CFB boiler is handled outside of the furnace 12, the handling comprising a step of fluidizing the solid material. The solid material separator 16 preferably comprises one or more cyclone separators.

FIG. 1 also shows a second external solid material handling system 21, in the CFB boiler 10, comprising a fluidized bed heat exchanger 45 arranged next to the furnace 12 having a common partition wall 50 with the furnace 12. The common partition wall 50 has at least one inlet opening 52 provided connecting the furnace 12 with the fluidized bed heat exchanger 45. The at least one inlet opening 52 is arranged to allow passing of the solid material from the furnace 12 to the heat exchanger 32 and, thus, circulating solid material out of the furnace 12, providing an external circulation of solid material by the second solid material handling system 21. At least one outlet opening 54 is also provided in the partition wall 50. The outlet opening 54 is in connection with a solid material discharge system 56 and it opens into the lower port of the furnace 12 above the grid 26 for controllably recycling at least part of the solid material from the fluidized bed heat exchanger 45 back to the bottom part of the furnace 12. The fluidized bed heat exchanger 45 is also provided with a wind box 58 having a separate fluidization section 59 for the solid material discharge system 56. The solid material discharge system 56 is here a so-called lifting chamber, the operation of which is controlled by controlling the introduction of fluidizing gas through the section 59 in the wind box 28.

The oxycombustion CFB boiler 10 is in connection with a source of oxygen 42 and a source of steam 44 by means of oxygen conduit 46 and steam conduit 48, respectively, the purpose of which is explained in the following.

The recycling conduit 38 is in flow communication with wind box 28 of the CFB boiler 10, in order to feed the recycling flue gas back into the furnace 12 as fluidizing gas. Additionally, the oxygen conduit 46 is connected to the wind box 28 and, during the operation of the oxycombustion CPB reactor, oxidant gas comprising a mixture of recycling flue gas and the oxygen is fed into the furnace 12 at least in a steady state condition.

In the oxycombustion CFB boiler 10, a circulating fluidizing bed is arranged by introducing an oxidant gas into the CFB boiler 10 through the grid 26. The oxidant gas fed through the grid 26 operates as fluidizing gas. The oxidant gas is led into the furnace 12 so that a sufficient gas velocity is maintained for creating a fluidizing bed therein so that at least part of the solid material (bed material) is conveyed along with the gas into the solid material separator 16. Fuel material is also fed into the circulating fluidizing bed by the feed 22. The fuel material is combusted in the furnace 12 with the aid of the oxygen in the oxidant gas.

During the operation of the oxycombustion CFB boiler 10, a sulfur reducing agent comprising $CaCO_3$ such as limestone, is introduced into the furnace 12 and, thus, into the circulating fluidizing bed. The limestone calcines in the furnace 12 to form calcium oxide ($CaCO_3 \rightarrow CaO+CO_2$), which reacts with $SO_2$ to form calcium sulfate ($CaO+SO_2+\frac{1}{2}O_2 \rightarrow CaSO_4$).

Calcium sulfate, being solid material, may be removed from the gas by separation. $CaSO_4$, as well as $CaO$, are efficiently mixed into the bed material of the CFB boiler 10 and, thus, they are present also in the external circulation of solid material of the CFB boiler 10.

In the CFB boiler 10 shown in FIG. 1, the main path of external circulation of solid material runs from the furnace 12 to the particle separator 16 of the CFB boiler 10. The separated solid particles are led further from the particle separator 16 at least partly back to the furnace 12 through the external solid, material handling system 20. In the external solid material handling system 20, the admission of solid particles back to the CFB boiler 10 is controlled by a loop seal 46 arranged in the system 20. The operation of the loop seal 46 is controlled by fluidizing medium, i.e., gas introduction into the loop seal.

The fluidization medium, which is introduced into the loop seal 46, is a mixture, of gaseous fluidizing medium, and a predetermined amount of steam therein.

Now, according to a preferred embodiment of the invention, a predetermined amount of steam from the source of steam 44 is mixed into the fluidizing medium prior to its introduction into the external solid material handling system as a fluidizing medium. This way, the recarbonization of CaO, originating from the sulfur reducing process being present in the external circulation of solid material in the first solid material handling system 20, particularly, in the loop seal 46, is minimized while being fluidized by the fluidizing medium. This way, the control and the operation of the loop seal is reliable, since the recarbonization of CaO is minimized and the phenomena caused by an excessive amount of $CaCO_3$ in the loop seal, namely, potential bed agglomeration/sintering and loss of fluidizing medium ($CO_2$) in the recarbonization reaction, is accordingly substantially avoided.

The loop seal 46 is provided with fluidization system 60, into which a gas conduit 62 is connected through which the fluidization medium is introduced into the fluidization system 60. The gas conduit 62 is provided with a mixing device 64 by means of which the mixture of the fluidizing medium is controlled. The source of steam 44 is in flow connection with the mixing device 64 by means of a first inlet conduit 66 having a control valve 68. Also, the source of oxygen 42 is in flow connection with the mixing device 64 by means of a second inlet conduit 70 having a control valve 72. Further, the recycling conduit 38 is in flow connection with the mixing device 64 by means of a third inlet conduit 74 having a control valve 76 arranged in the third inlet conduit 74. The mixing device 64 makes it possible to control the ratio of the components of the fluidizing gas, which is available through the first, the second, and the third inlet conduits. It should be understood that, contrary to the presentation of FIG. 1, the mixing device may be integrated into the fluidization system 60 or the loop seal 46.

In the CFB boiler shown in FIG. 1, there is another path of external circulation of solid material by the second solid material handling system 21. This comprises an external fluidized bed heat exchanger 45 next to the furnace 12 and, finally, a path back to the furnace 12. The fluidized bed heat exchanger 45 is provided with a wind box 58 with a separate section 59 for the solid material discharge system 56. The fluidization medium that is introduced into the wind box 58 is a mixture of gaseous fluidizing medium and a predetermined amount of steam mixed prior to the introduction into the fluidized bed heat exchanger 45.

Now, correspondingly to the behavior in the loop seal 46, as described above, a predetermined amount of steam from the source of steam 44 is mixed into the fluidizing medium prior to its introduction into the external solid material handling system, i.e., into the wind box 58 as a fluidizing medium. This way, the recarbonization of CaO, originating from the sulfur reducing processing being present in the external fluidized bed heat exchanger 45 is minimized while being fluidized by the fluidizing medium. This way, the control and the operation of the fluidized bed heat exchanger 45 is reliable, since the recarbonization of CaO is minimized and the phenomena caused by excessive formation of $CaCO_3$, namely, potential bed agglomeration/sintering, loss of fluidizing gas, and carburization of heat surface tubes in a high $CO_2$ environment, is, accordingly, substantially avoided.

The external fluidized bed heat exchanger 45 is provided with a fluidization system, i.e., are wind box 58, into which a gas conduit 80 is connected, through which the fluidization medium is introduced into the wind box 58 and its separate section 59. The gas conduit 80 is provided with a mixing device 64, by means of which the mixture of the fluidization medium is controlled. The source of steam 44 is in flow connection with the mixing device 64 by means of a first inlet conduit 66 having a control valve 68. Also, the source of oxygen 42 is in flow connection with the mixing device 64 by means of a second inlet conduit 70 having a control valve 72. Further, the recycling conduit 38 is in flow connection with the mixing device 64 by means of a third inlet conduit 74 having a control valve 76 arranged in the third inlet conduit 74. The mixing device 64 makes it possible to control the ratio of the components of the fluidizing gas available through the first, the second, and the third inlet conduits.

According to an embodiment of the invention, the temperature of the solid material in the external solid material handling system is measured directly or indirectly by a temperature measurement system 82, and the step of defining the relative shares of the first portion, the second portion, and the third portion comprises utilization of the actual solid material temperature information. More specifically, the predetermined amount of steam is controlled so that the $CO_2$ partial pressure in the fluidizing medium is maintained below the equilibrium pressure for recarbonization of CaO at the measured template of the solid material.

FIG. 1 also shoves that each of several solid material handling systems, or parts thereof, where fluidization is required, is provided with a mixing device 64 of their own.

Figure 2:
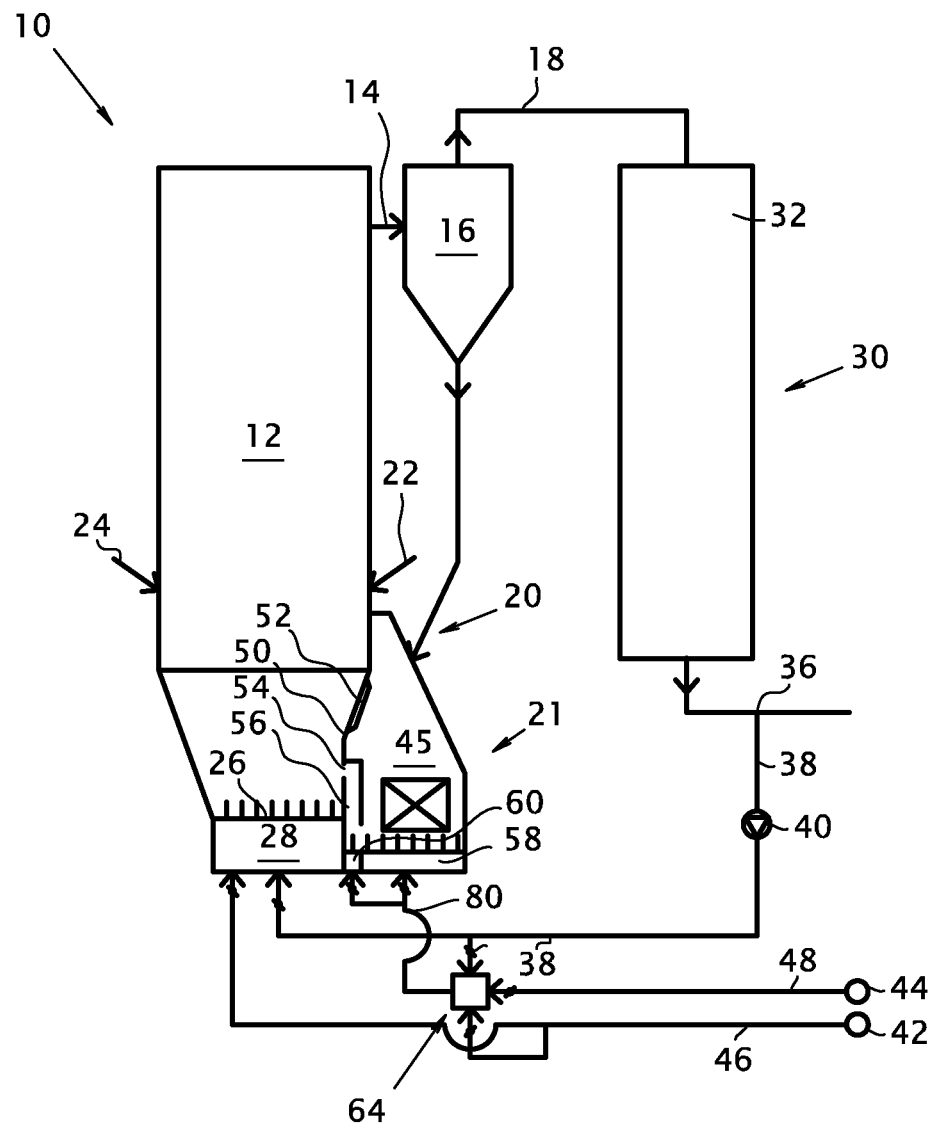
FIG. 2 illustrates an oxycombustion CFB boiler, in which the method of operating an oxycombustion CFB boiler according to another embodiment of the invention may be advantageously practiced.

FIG. 2 schematically shows an oxycombustion CFB boiler 10, in which the method of operating an oxycombustion CFB boiler according to an embodiment of the invention may be advantageously practiced. To a large extent, this boiler is similar to that shown in FIG. 1 and, thus, corresponding reference numerals are used for the corresponding elements. The embodiment of FIG. 2 differs from the one shown in FIG. 1 by the fact that the solid material returning system, at the lower end of the solid material separator 16 for circulating solid material, and the fluidizing bed heat exchanger 45, arranged next to the furnace 12, are connected with each other. Thus, it is clear that there is a loop seal in the fluidized bed heat exchanger, too. This means that the solid material separated by the separator 16 is directed to the fluidizing bed heat exchanger. Even if it is not shown here, the solid material may be directed directly back to the furnace or the separated material is cooled in the heat exchanger prior to being fed back to the furnace.

FIG. 2 also shows only one mixing device 64, which illustrates that, according to an embodiment of the invention, the CFB boiler is provided with only one mixing device 64, in which a predetermined amount of steam 44 is mixed into the fluidizing medium, from which mixing device 64, the fluidizing medium is directed to each of several material handling systems or parts thereof where fluidization is required.

Figure 3:
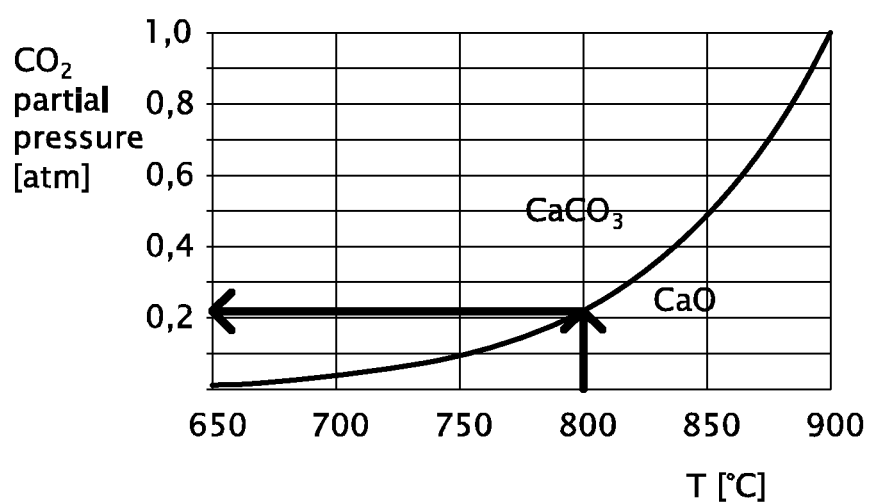
FIG. 3 illustrates an exemplary diagram of the equilibrium for calcium carbonate and calcium oxide as a function of $CO_2$ partial pressure.

FIG. 3 shows an exemplary diagram of equilibrium for calcium carbonate and calcium oxide as a function of $CO_2$ partial pressure and temperature. It can be seen that, for example, at the temperature of 800° C., the $CO_2$ partial pressure should be less than about 0.2 atm in order to avoid recarbonization of CaO. Thus, according to an embodiment of the invention, the predetermined amount of steam mixed into the fluidizing medium is controlled so that the $CO_2$ partial pressure in the fluidizing medium is maintained below the equilibrium pressure for recarbonization of CaO at the prevailing temperature of the fluidizing medium and/or solid material to be fluidized.

Figure 4:
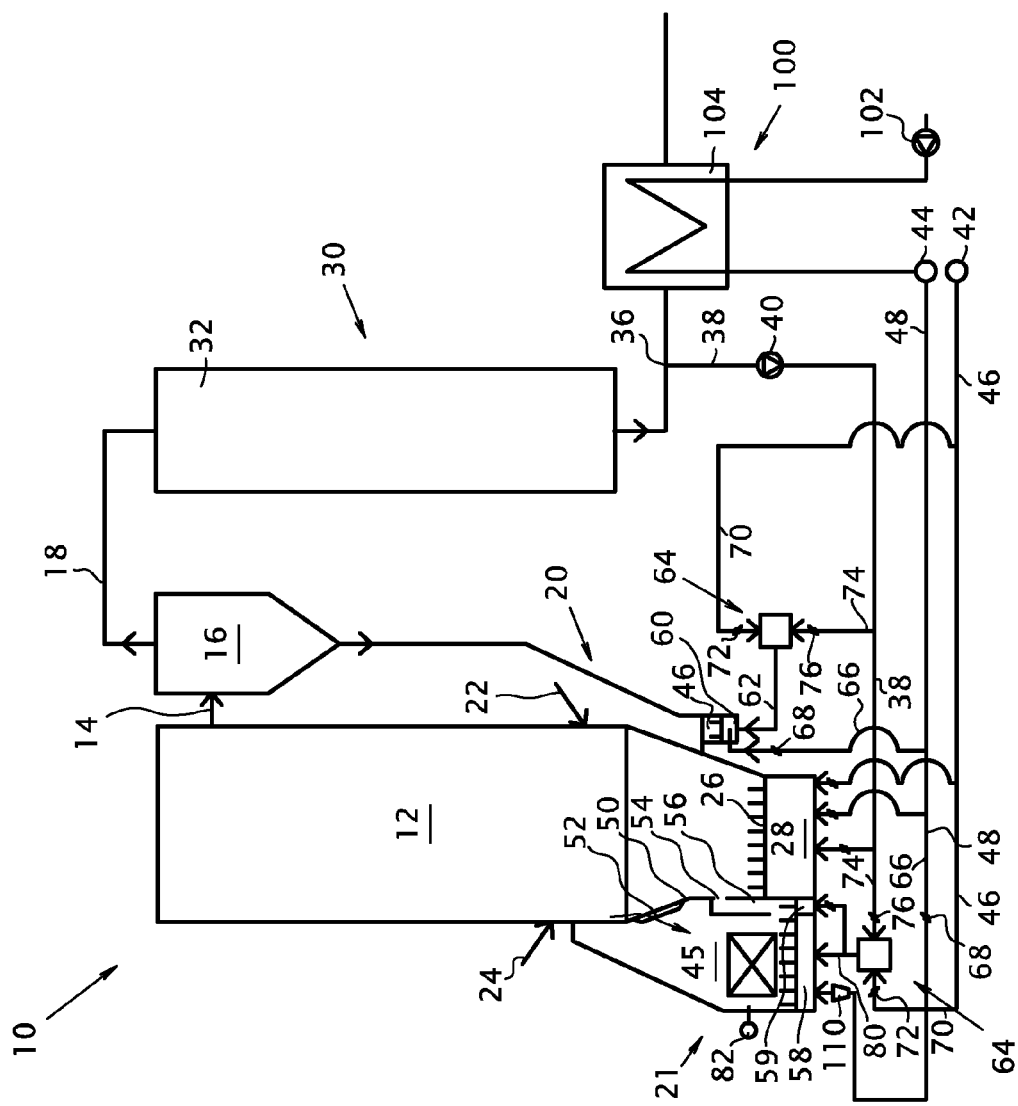
FIG. 4 illustrates an oxycombustion CFB boiler, in which the method of operating an oxycombustion CFB boiler according to yet another embodiment of the invention may be advantageously practiced.

FIG. 4 illustrates yet another embodiment of the invention. Mainly, it is similar to that of the embodiment shown in FIG. 1 and, thus, corresponding reference numbers are used in connection with corresponding features and elements. It also operates to a large extent similarly. The most significant difference in the oxycombustion CFB boiler 10 of FIG. 4 relates to the concept of the external solid material handling system, and, particularly, to the fluidizing medium.

First the loop seal 46 is provided with fluidization system 60, into which a gas conduit 62 is connected, through which the fluidizing medium is introduced into the fluidization system 60. The gas conduit 62 is provided with a mixing device 64, by means of which the mixture of the fluidization medium is formed and controlled. It should be understood that the mixing device 64 may be integrated into the fluidization system 60. In this embodiment, the source of steam 44 is in flow connection directly with the fluidization system 60. The arrangement is provided with a first inlet conduit 66 having a control valve 68 for introducing the steam. The source of oxygen 42 is in flow connection with the mixing device 64 by means of a second inlet conduit 70 having a control valve 72. Further, the recycling conduit 38 is in flow connection with the mixing device 64 by means of a third inlet conduit 74 having a control valve 76 arranged in the third inlet conduit 74. This way, the oxygen is preferably mixed with the recycled flue gas prior to its introduction into the fluidization system 60, i.e., the loop seal, in this case, According to another embodiment of the invention, the steam is introduced as water at a first pressure and at a first temperature, and the water is depressurized to a second pressure, being lower than the first pressure, in such a manner that expansion steam is generated during the introduction of the steam as a fluidizing medium. This is depicted in the FIG. 4 example by an expansion unit 110 in the wind box 58, or immediately prior to it.

FIG. 4 also illustrates that the source of steam 44 is in direct flow connection with the wind box 28 of the CFB boiler 10. Thereby, the steam is evenly distributed into the area, through which the fluidization medium is introduced into the CFB bolier 10.

The fluidizing medium of the fluidized bed heat exchanger 45 comprises a mixture of gaseous fluidization medium and a predetermined amount of steam mixed prior to the introduction into the fluidized bed heat exchanger 45. In the embodiment of FIG. 4, the source of steam 44 is in flow connection directly with the wind box 58. The gas conduit 80 connected to the wind box 58 is provided with a mixing device 64, by means of which, the mixture of the fluidization medium is partially controlled. The source of steam 44 is now in a separate flow connection with the wind box 58. However, the source of oxygen 42 is in flow connection with the mixing device 64 by means of a second inlet conduit 70 having a control valve 72. Further, the recycling conduit 38 is in flow connection with the mixing device 64 by means of a third inlet conduit 74 having a control valve 76 arranged in the third inlet conduit 74. The mixing device 64 makes it possible to control the ratio of components of the fluidizing gas fed through the conduits. The mixing device does not have to be separate from the wind box 58, but it may be as well integrated thereto.

FIG. 4 also shows an embodiment of a steam production unit 100, which serves as the source of steam. The steam production unit 100 is arranged to receive heat from the flue gas flowing through the flue gas passage 18. The steam production unit 100 comprises a water pump 102 that increases the pressure of the water to a desired level above the atmospheric pressure. Pressurized water is led to a heat exchanger 104 connected to the flue gas passage 18, in which the water is evaporated and superheated.

Figure 5:
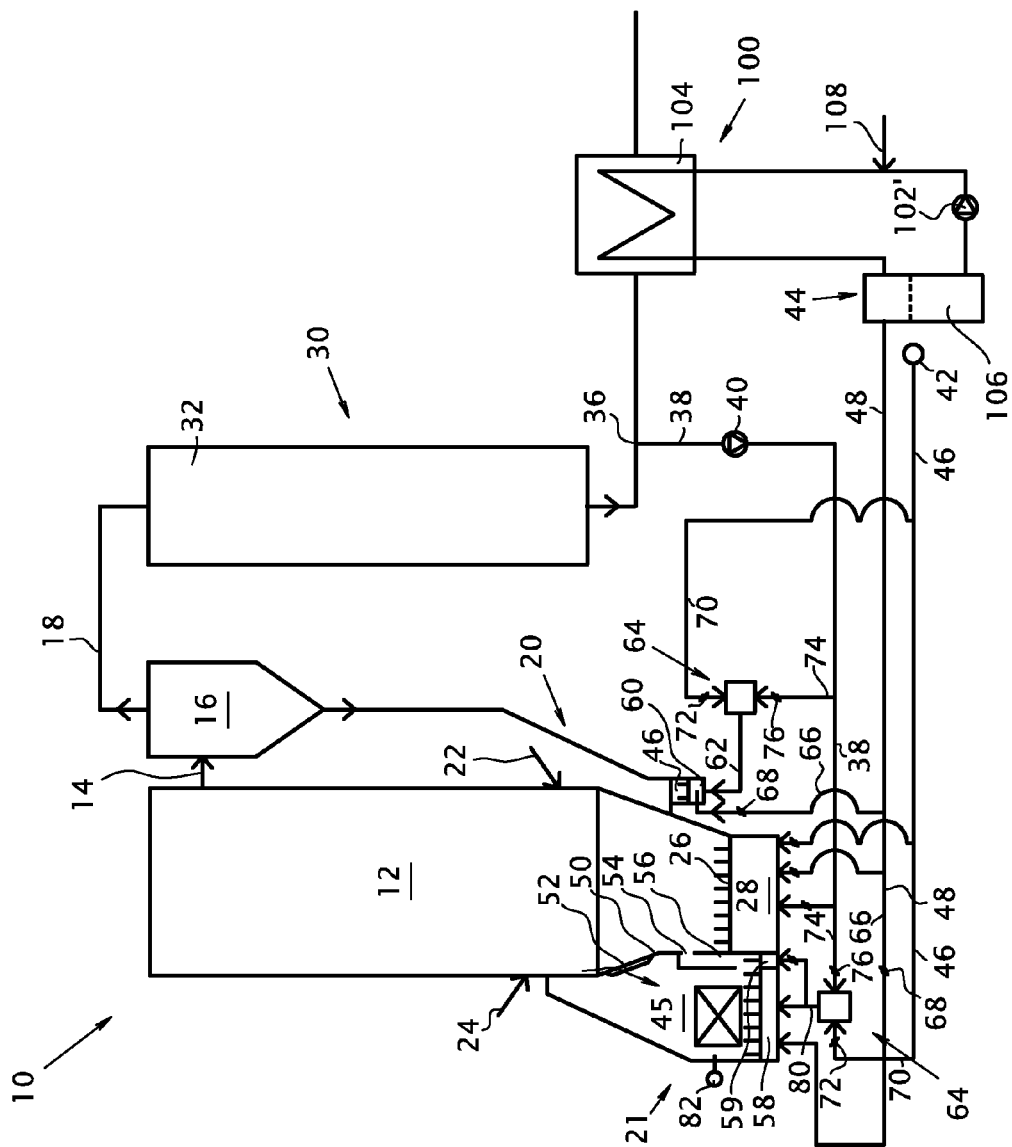
FIG. 5 illustrates an oxycombustion CFB boiler, in which the method of operating an oxycombustion CFB boiler according to yet another embodiment of the invention may be advantageously practiced.

FIG. 5 illustrates yet another embodiment of the invention. Mainly, it is similar to that shown in FIG. 4 and, thus, corresponding reference numbers are used in connection with corresponding features and elements. FIG. 5 depicts another embodiment of steam production unit 100, which serves as the source of steam 44. The steam production unit 100 is also arranged to receive heat from the flue gas flowing in the flue gas passage 18. There is a circuit comprising a flash tank 106 in which expansion steam is produced, which circuit is used as the source of steam 44. The lower part of the flash tank 106 is connected to the heat exchanger 104 and a water pump 102' is arranged into the connection conduit. The pump 102' increases the pressure of the water to a desired level above the atmospheric pressure. Pressurized water is led to a heat exchanger 104 connected to the flue gas passage 18, in which the water is heated. Subsequently, the pressurized and heated water is introduced in the flash tank to a lower pressure, thus producing expansion steam. An inlet for make-up water 108 is provided in the circuit to compensate for the expansion steam that is produced and used. This has the advantage that the water used for producing expansion steam does not need any (or needs only minor) treatment, which makes the arrangement, e.g., straightforward to operate.

It is to be noted that only a few most advantageous embodiments of the invention have been described above. Thus, it is clear that the invention is not limited to the above-described embodiments, but may be applied in many ways within the scope of the appended claims. Thus, it is clear that the source of steam may practically be any available low pressure steam source, such as from a steam turbine extraction, etc. The features disclosed in connection with various embodiment can also be used in connection with other embodiments within the inventive scope, and/or different assemblies can be combined from the disclosed features, should it be desired and should it be technically feasible to do so.

The invention claimed is:

1. A method of operating an oxycombustion circulating fluidized bed (CFB) boiler that includes a furnace having a grid at its bottom section, a solid material separator connected to an upper part of the furnace, and an external solid material handling system, the method comprising steps of:
arranging a circulating fluidized bed in the oxycombustion CFB boiler;
introducing an oxidant gas into the CFB boiler through the grid as fluidizing gas, the fluidizing gas comprising recirculating flue gas;
introducing fuel material into the circulating fluidized bed;
introducing sulfur reducing agent comprising $CaCO_3$ into the circulating fluidized bed;
circulating solid material out of the furnace and providing an external circulation of the solid material via the external solid material handling system;
fluidizing the solid material in the external solid material handling system by introducing a fluidizing medium comprising the recirculating flue gas into the external solid material handling system;
introducing a predetermined amount of steam into the external solid material handling system as a component of the fluidizing medium; and
controlling the predetermined amount of steam so that $CO_2$ partial pressure in the fluidizing medium is maintained below an equilibrium pressure for recarbonization of CaO at the prevailing temperature in the external solid material handling system.

2. The method of operating the oxycombustion CFB boiler according to claim 1, further comprising mixing steam into the fluidizing medium prior to introduction of the fluidizing medium into the external solid material handling system as the fluidizing medium.

3. The method of operating the oxycombustion CFB boiler according to claim 1, further comprising distributing the steam evenly into the external solid material handling system as the fluidizing medium separately from the other components of the fluidizing medium introduced into the external solid material handling system.

4. The method of operating the oxycombustion CFB boiler according to claim 1, further comprising mixing the steam into the fluidizing medium during introduction of the fluidizing medium into the external solid material handling system as the fluidizing medium.

5. The method of operating the oxycombustion CFB boiler according to claim 1, further comprising generating steam as expansion steam from water originally at a first pressure and at a first temperature by depressurizing the water to a second pressure being lower than the first pressure, prior to the introduction of the steam into the external solid material handling system as the fluidizing medium.

6. The method of operating the oxycombustion CFB boiler according to claim 1, further comprising generating steam as expansion steam from water originally at a first pressure and at a first temperature by depressurizing the water to a second pressure being lower than the first pressure, during the introduction of the steam into the external solid material handling system as the fluidizing medium.

7. The method of operating the oxycombustion CFB boiler according to claim 1, further comprising transporting the solid material with the flue gases to the solid material separator, separating the solid material from the flue gases in the solid material separator, and recycling the separated solid material from the separator back to the furnace through the external solid material handling system.

8. The method of operating the oxycombustion CFB boiler according to claim 7, wherein the external solid material handling system comprises a loop seal in which the solid material is fluidized and further comprising introducing the predetermined amount of steam into the fluidizing medium prior to introduction of the fluidizing medium into the loop seal.

9. The method of operating the oxycombustion CFB boiler according to claim 7, wherein the external solid material handling system comprises a loop seal in which the solid material is fluidized and further comprising introducing the predetermined amount of steam into the fluidizing medium during introduction of the fluidizing medium into the loop seal.

10. The method of operating the oxycombustion CFB boiler according to claim 1, wherein the external solid material handling system comprises a fluidized bed heat exchanger and further comprising (i) circulating the solid material out of the furnace into the fluidized bed heat exchanger and (ii) mixing the predetermined amount of steam into the fluidizing medium prior to introduction of the fluidizing medium into the fluidized bed heat exchanger.

11. The method of operating the oxycombustion CFB boiler according to claim 1, wherein the external solid material handling system comprises a fluidized bed heat exchanger and further comprising circulating the solid material out of the furnace into the fluidized bed heat exchanger.

12. The method of operating the oxycombustion CFB boiler according to claim 1, further comprising generating the steam by making use of the heat produced in the oxycombustion CFB boiler.

13. The method of operating the oxycombustion CFB boiler according to claim 10, wherein the fluidizing medium comprises a first portion that includes the recirculating flue gas, a second portion that includes oxygen, and a third portion that includes steam, the method further comprising (i) determining one of the flow rate and amount of the introduced sulfur reducing agent comprising $CaCO_3$ into the circulating fluidized bed, and (ii) defining the relative shares of the first portion, the second portion, and the third portion based on the determined one of the flow rate and the amount of the introduced sulfur reducing agent.

14. The method of operating the oxycombustion CFB boiler according to 13, further comprising introducing the fluidizing medium comprising the defined relative shares of the first portion, the second portion, and the third portion, respectively.

15. The method of operating the oxycombustion CFB boiler according to claim 13, further comprising directly measuring the temperature of the solid material in the external solid material handling system, wherein the step of defining the relative shares of the first portion, the second portion, and the third portion comprises utilizing the actual solid material temperature information.

16. The method of operating the oxycombustion CFB boiler according to claim 13, further comprising indirectly measuring the temperature of the solid material in the external solid material handling system, wherein the step of defining the relative shares of the first portion, the second portion, and the third portion comprises utilizing the actual solid material temperature information.

17. The method of operating the oxycombustion CFB boiler according to claim 11, further comprising mixing the predetermined amount of steam into the fluidizing medium during introduction of the fluidizing medium into the fluidized bed heat exchanger.

18. The method of operating the oxycombustion CFB boiler according to claim 1, further comprising generating the steam as expansion steam.

* * * * *